US008645197B1

(12) United States Patent
Micek et al.

(10) Patent No.: US 8,645,197 B1
(45) **Date of Patent: *Feb. 4, 2014**

(54) METHOD OF FACILITATING CONTACT BETWEEN A CONSUMER AND A REQUESTING ENTITY

(75) Inventors: Michael A. Micek, Omaha, NE (US); Thomas B. Barker, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/611,224

(22) Filed: Sep. 12, 2012

Related U.S. Application Data

(63) Continuation of application No. 09/883,149, filed on Jun. 15, 2001, now Pat. No. 8,280,761.

(51) Int. Cl.
*G06Q 40/00* (2012.01)

(52) U.S. Cl.
USPC ........ 705/14; 705/1; 705/16; 705/26; 705/36; 705/38; 705/39; 705/40; 705/44

(58) Field of Classification Search
USPC ........ 705/40, 35, 38, 10, 14, 26, 39, 1, 44, 16
See application file for complete search history.

(56) References Cited

U.S. PATENT DOCUMENTS

| | | | | | |
|---|---|---|---|---|---|
| 5,274,547 | A | * | 12/1993 | Zoffel et al. | 705/38 |
| 5,311,572 | A | | 5/1994 | Friedes et al. | |
| 5,704,044 | A | * | 12/1997 | Tarter et al. | 705/4 |
| 5,809,481 | A | * | 9/1998 | Baron et al. | 705/14.4 |
| 5,915,243 | A | | 6/1999 | Smolen | |
| 5,964,839 | A | | 10/1999 | Johnson | |
| 5,978,462 | A | | 11/1999 | Fuhrmann et al. | |
| 6,014,635 | A | * | 1/2000 | Harris et al. | 705/14.17 |
| 6,016,479 | A | | 1/2000 | Taricani, Jr. | |
| 6,134,593 | A | * | 10/2000 | Alexander et al. | 709/229 |
| 6,151,385 | A | | 11/2000 | Reich et al. | |
| 6,456,983 | B1 | * | 9/2002 | Keyes et al. | 705/36 R |
| 6,636,833 | B1 | * | 10/2003 | Flitcroft et al. | 705/64 |
| 7,006,994 | B1 | * | 2/2006 | Campbell et al. | 705/40 |
| 2001/0011245 | A1 | * | 8/2001 | Duhon | 705/38 |
| 2003/0120546 | A1 | * | 6/2003 | Cusack et al. | 705/16 |

* cited by examiner

*Primary Examiner* — Charles Kyle
*Assistant Examiner* — Siegfried E Chencinski

(57) ABSTRACT

The invention provides a method of facilitating contact between a consumer and a requesting entity, with the method comprising the following steps. During an interaction with the consumer, the method of the invention obtains contact information and index information from the consumer. The method then evaluates whether the consumer meets a selection criterion specified by the requesting entity using the indexing information. A data store entry associated with the consumer can be updated with the contact information. The contact information is then referred to the requesting entity thereby providing the requesting entity with up-to-date contact information.

41 Claims, 12 Drawing Sheets

METHOD OF FACILITATING CONTACT BETWEEN A CONSUMER AND A REQUESTING ENTITY

CROSS-REFERENCE TO RELATED APPLICATIONS

This application is a continuation from U.S. patent application Ser. No. 09/883,149, filed Jun. 15, 2001, and entitled "METHOD OF FACILITATING CONTACT BETWEEN A CONSUMER AND A REQUESTING ENTITY", which is incorporated by reference herein in its entirety.

BACKGROUND OF THE DISCLOSURE

One of the significant problems facing the customer service industry is maintaining up-to-date contact information for consumers. In the context of debt collection, it is virtually impossible for collection agencies to contact debtors to discuss repayment without current contact information. For transient debtors, it can be especially difficult for creditors to maintain current contact information. However, when those debtors surface to conduct transactions with other potential creditors, those transactions provide an opportunity to obtain current contact information for the debtor. Existing creditors may not be aware of such transactions, and of this opportunity to obtain up-to-date contact information for the debtor. Without current contact information, the creditor's collection efforts become much less efficient and more expensive to conduct and will most likely fail.

Another example is the survey or polling industry. Often, a polling firm may wish to survey a chosen demographic group having certain characteristics, such as age, sex, income, occupation or the like, that fall within prescribed ranges. For example, a polling firm may wish to take a marketing survey of women between the ages of 35 and 45, who work in the information technology industry and who earn an income ranging from $50,000 to $100,000. However, it can be difficult and expensive to locate a statistically-significant sample of survey respondents having characteristics that fall within those prescribed ranges. Yet, if the polling firm does not assume that expense to locate the appropriate sample of respondents, then the resulting survey is worthless. Conversely, if the polling firm assumes this expense to obtain valid survey results, then the cost of performing the survey increases accordingly, making the survey less attractive to clients of the polling firm.

Yet another example is a merchant who is having difficulty contacting a consumer to discuss a customer service matter, such as a product recall notification, an arrangement to return a product, a new product announcement, or other similar matters. For example, the consumer and the merchant may have previously conducted business, but since then the consumer may have moved several times, causing the merchant to lose contact with the consumer.

In light of these circumstances, there exists a need in the art for a method of facilitating contact between a consumer and a requesting entity, such as a collection agency, a polling firm, a merchant, or others by providing current contact information for a consumer, preferably in real time as soon as the contact information is available.

The invention provides a method of facilitating contact between a consumer and a requesting entity. The method can comprise at least the following steps. During an interaction with the consumer, the method obtains contact and index information from the consumer. Using the index information, the method accesses a data store, with the data store containing at least one selection criterion of interest to the requesting entity. The method then evaluates whether the consumer meets the selection criterion based on the result of the access to the data store. If the consumer meets the selection criterion, the method refers the contact information for the consumer to the requesting entity.

BRIEF DESCRIPTIONS OF THE DRAWINGS

DETAILED DESCRIPTION OF ILLUSTRATIVE EMBODIMENTS

Overview of the Invention

Figure 1:
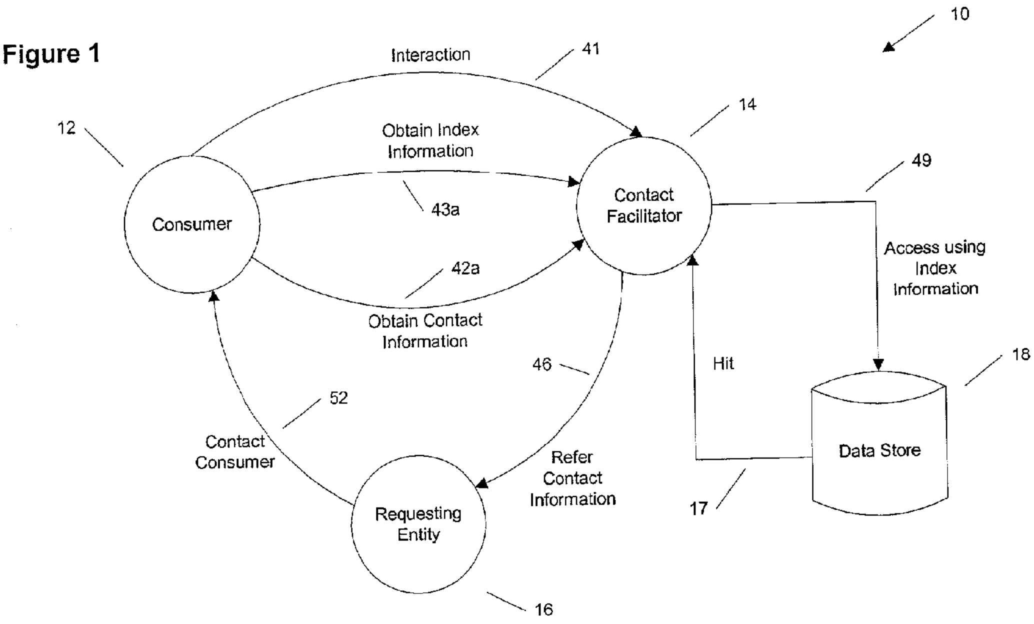
FIG. 1 is a high-level block diagram of the data flow employed by the invention as applied in a general context.

FIG. 1 is a high-level block diagram of the data flow employed by the invention as applied in a general context, referenced generally as embodiment 10. The invention provides a method for facilitating contact between a consumer 12 and a requesting entity 16, with the method comprising at least the following steps. The consumer 12 interacts with a contact facilitator 14, which may be, for example, a teleservices bureau that processes telephone calls on behalf of clients. The interaction, symbolized by the arrow 41, may be a purchase of goods and/or services, a request for customer service or support, an inquiry about goods and/or services offered by a merchant-client of the contact facilitator 14, or a similar transaction, as discussed more fully in connection with FIG. 7 below. During this interaction, the contact facilitator 14 obtains contact information and index information from the consumer 12, as represented by respective arrows 42*a* and 43*a*. Contact information 42*a* and index information 43*a* are discussed further in connection with FIGS. 8 and 9 below. Using the index information 43*a*, the contact facilitator 14 accesses a data store 18, which contains at least one selection criterion of interest to the requesting entity 16. Using the contents of the data store 18 and the index information 43*a*, the contact facilitator 14 evaluates whether the consumer 12 meets a selection criterion, as indicated by a hit signal as represented by arrow 17 becoming active. Should the hit signal 17 become active, the contact facilitator 14 refers the contact information 42*a* to the requesting entity 16 for subsequent contact, as represented by arrow 46. As recognized by those skilled in the art, hit signal 17 may be implemented as a program variable, a processor interrupt, or the like. The requesting entity 16 then contacts the consumer 12 using the newly-acquired contact information 42*a*.

Figure 4:
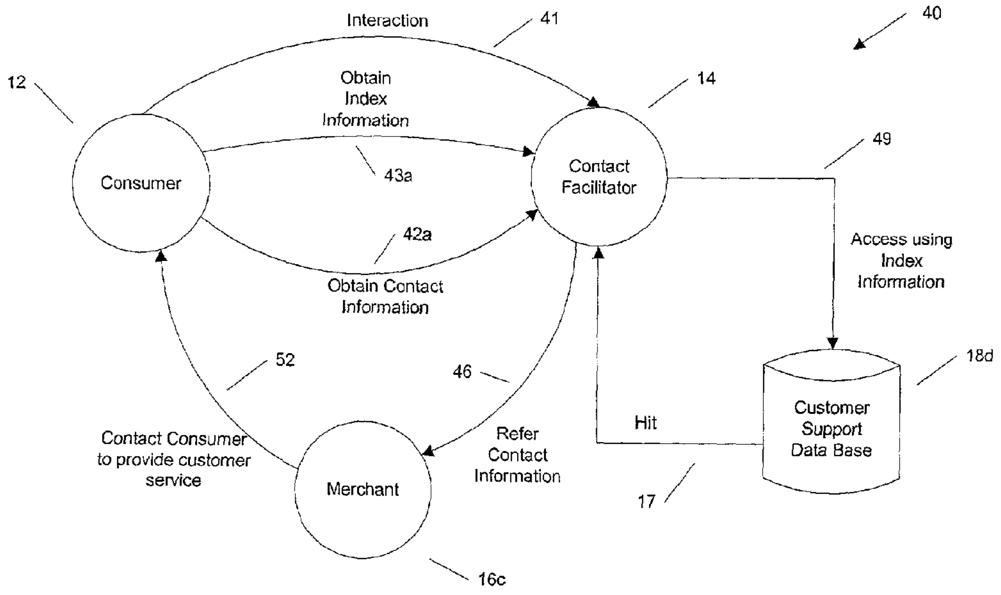
FIG. 4 is a block diagram of the invention as applied in the context of locating a consumer for customer service.
Figure 5:
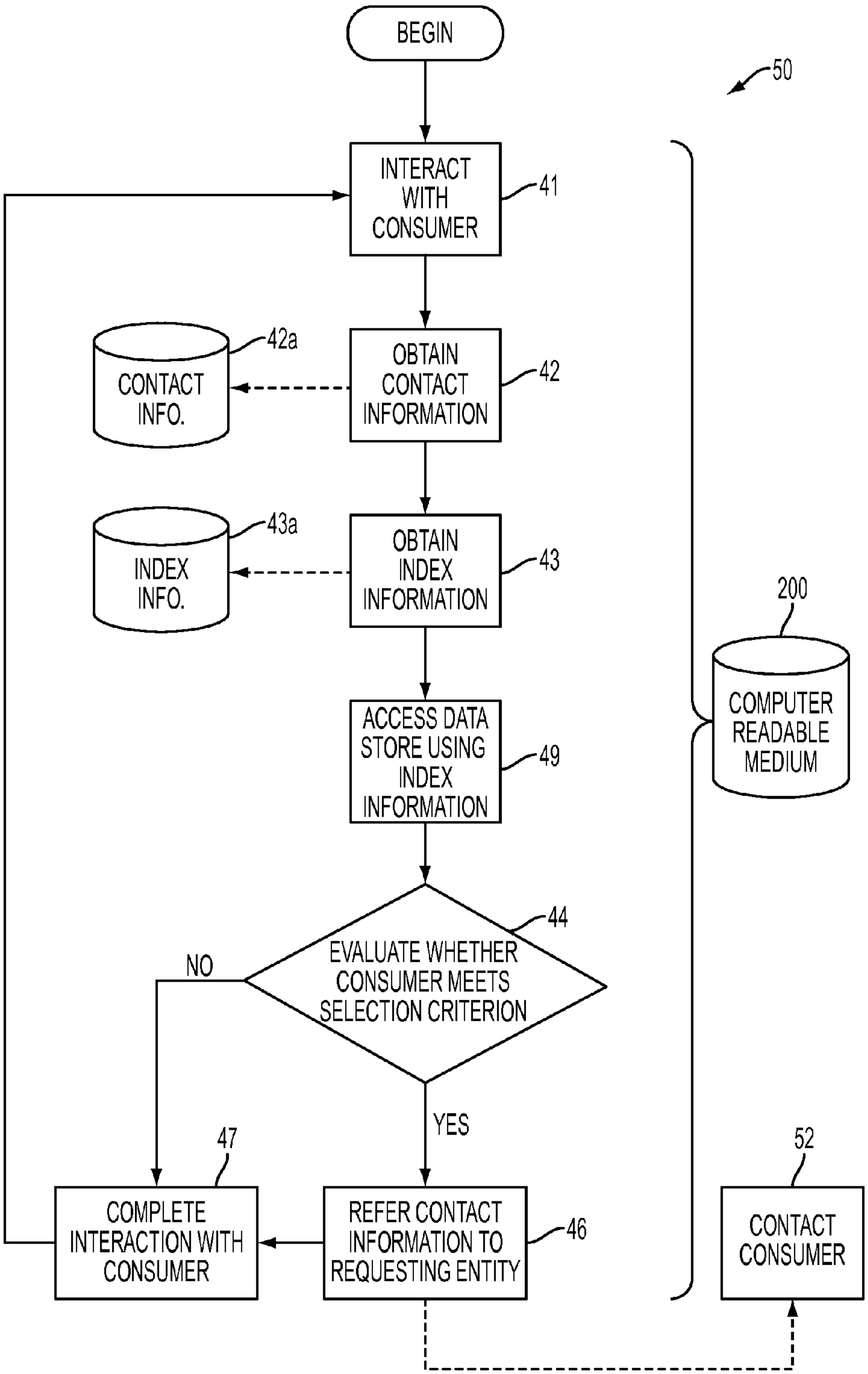
FIG. 5 is a flowchart of an illustrative processing flow provided by the invention.

FIG. 5 is an overview flowchart of an illustrative processing flow 50 provided by the invention. The invention provides a method of facilitating contact between a consumer 12 and a requesting entity 16, with the method comprising the following steps. During an interaction with the consumer 12 (block 41), the method of the invention obtains contact information 42 and index information 43 from the consumer 12 (blocks 42 and 43, respectively). Note that for conciseness and consistency, the same reference numerals identify the data flows in FIGS. 1-4 and the method steps shown in FIG. 4 that involve those data flows. The method then determines whether the consumer 12 meets a selection criterion using the index information (block 44). The contact information is then referred to a requesting entity 16 (block 46). At block 47, the current interaction with the consumer 12 is completed. If the consumer 12 does not meet any selection criterion, then the method proceeds directly from block 44 to block 47. Otherwise, if the consumer 12 meets a selection criterion, the method passes through blocks 45 and 46.

Figure 6:
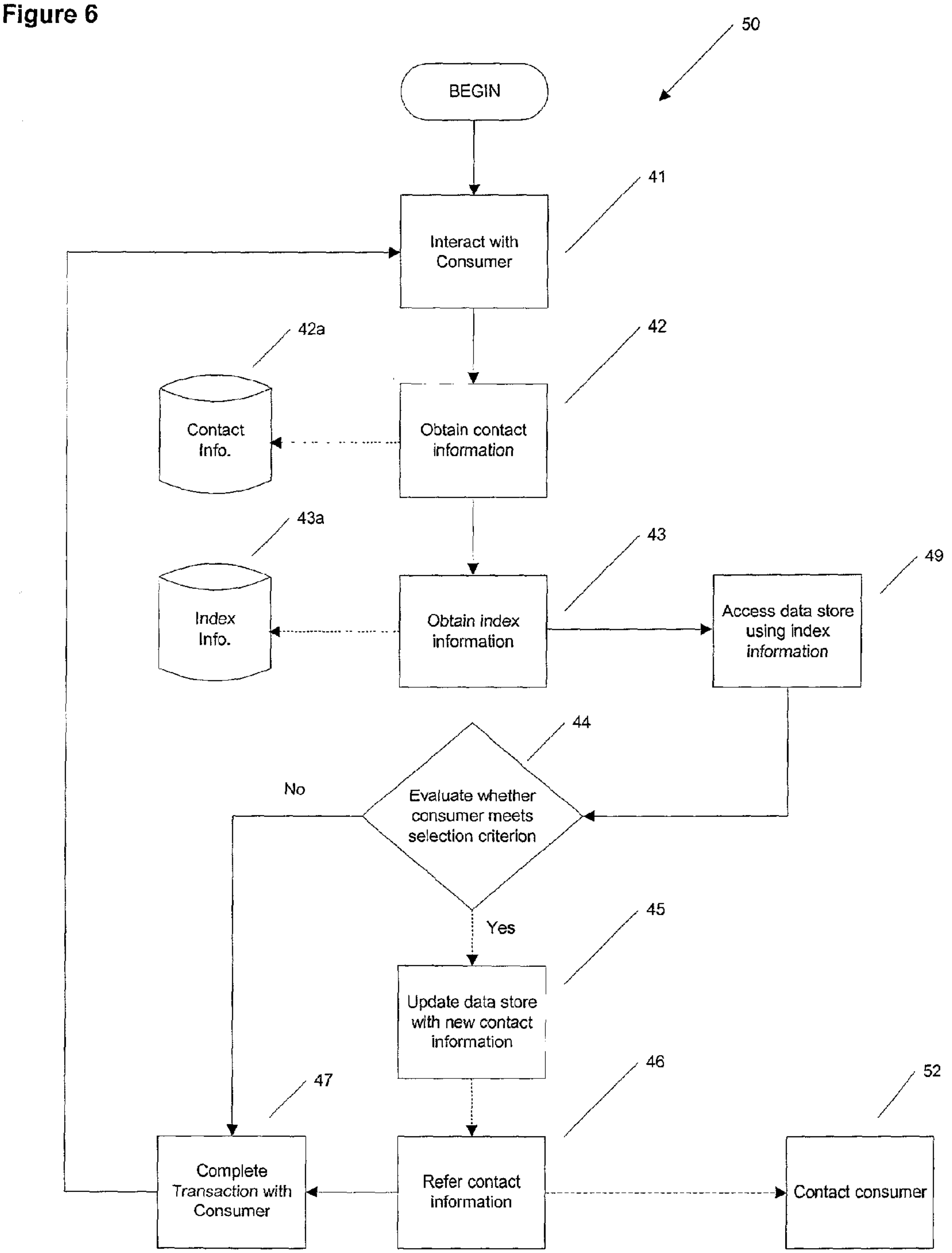
FIG. 6 is the flowchart of an illustrative processing flow as shown in FIG. 5, but with a step of contacting the consumer added.

FIG. 6 is a flowchart 50 of the illustrative processing flow 40 as shown in FIG. 5, but with contacting step 52 and updating step 45 added. In the contacting step 52, the creditor/collection agency 16*a* uses the current contact information 42 received from the contact facilitator 14 to contact the consumer 12 in an effort to collect the debt owed by the consumer 12. As discussed in further detail below, the contacting step 52 could be performed by the same entity or entities that performed the other steps shown in FIG. 5 or 6 or by another separate entity. A data store entry associated with the consumer can be updated with the contact information (block 45).

Debt Collection Embodiment

Figure 2:
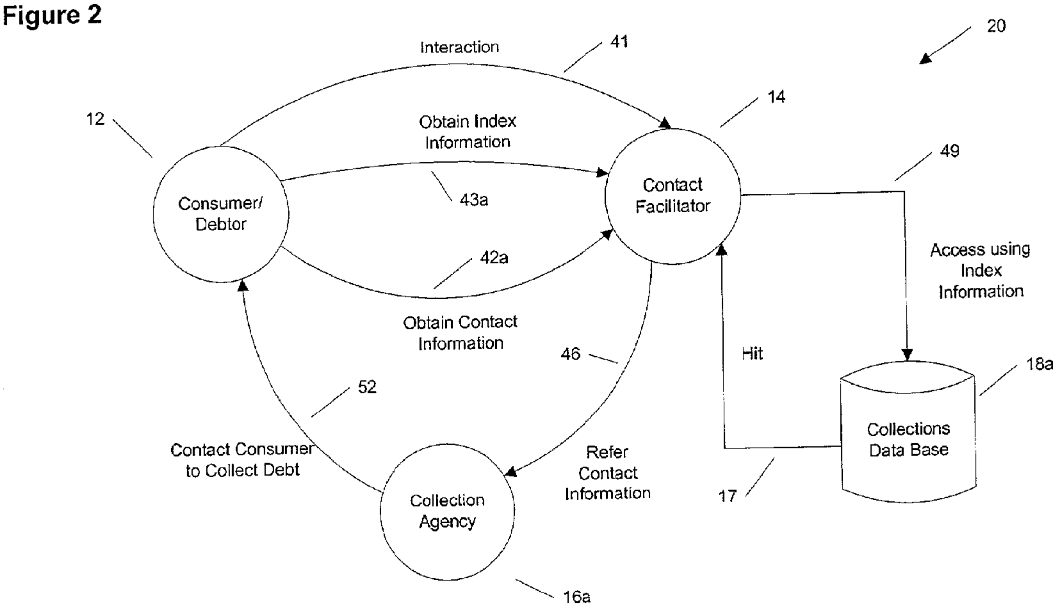
FIG. 2 is a block diagram of the invention as applied in the context of debt collection.

FIG. 2 is a block diagram of an embodiment 20 of the invention as applied in the context of debt collection. In this debt collection embodiment 20, the data store 18 takes the form of a collections database 18*a*, and the requesting entity 16 takes the form of a collections agency 16*a*. In this application, the selection criterion is whether the consumer 12 is subject to a collection effort. The step of accessing the data store 18 includes accessing the collections database 18 to evaluate whether the consumer is subject to a collections effort conducted by a collections agency. The collections database 18 is typically provided by the collection agency, and contains a list on consumers who have overdue debts that are being collected by the agency. The step of evaluating includes determining whether any entry in the collection database corresponds to the consumer. If so, the consumer's contact information is referred to the collection agency.

Figure 18:
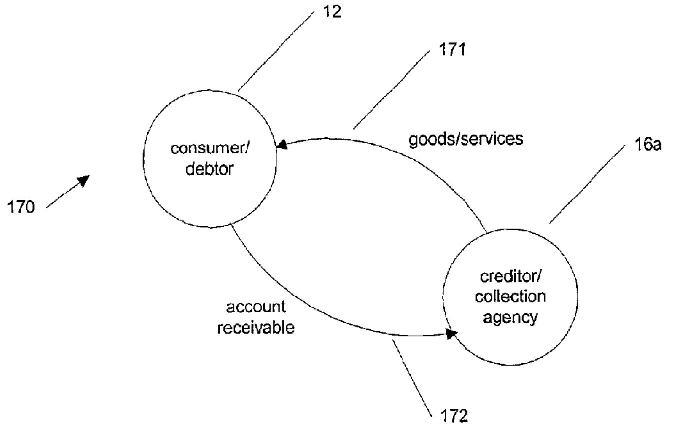
FIG. 18 is a block diagram of a typical transaction between a consumer and a creditor.

FIG. 18 is a block diagram of a typical transaction 170 between a consumer 12 and a creditor 16*a*. The consumer 12 obtains goods and/or services from the creditor 16*a*, as represented by the arrow 171. The creditor 16*a* typically enters the transaction as a merchant and may become a creditor 16*a* depending on the course of the transaction. If the consumer 12 pays cash or otherwise immediately settles the transaction, then the transaction is closed as between the creditor 16*a* and the consumer 12. However, the transaction might not settle immediately. For example, the merchant may finance the transaction through a loan to the consumer 12, which loan the consumer 12 promises to repay. Another example is if the consumer 12 provides a check, note or other negotiable instrument as payment. Ultimately, the merchant, or the merchant's assignee, must collect on this instrument. In such cases, the merchant becomes a creditor 16*a* and receives an account receivable, or debt, from the consumer 12 as represented by the arrow 172.

In the context of this application, the "consumer" 12 refers broadly to any recipient of goods and/or services, and may be a retail consumer, a wholesale consumer, or any other type of consumer. The "creditor" 16*a* refers to any entity that is owed a payment by the consumer 12. Further, the transactions illustrated and discussed herein may be retail business-to-consumer transactions, business-to-business transactions, or any other type of transaction.

Should the consumer 12 default on his or her promise to repay the debt represented by the arrow 172, or if a negotiable instrument provided by the consumer 12 is dishonored or otherwise not paid, then the creditor 16*a* may refer the debt to a collection agency for collection, or may institute proceedings in-house to collect the debt. For clarity and conciseness, the drawings illustrate a combined creditor/collection agency 16*a*. However, this illustration is for convenience only and is not intended to limit the scope of the invention. After collection proceedings commence, the creditor 16*a* typically contacts the consumer 12 to discuss repayment of the debt. Accordingly, current and accurate contact information for the consumer 12 is critical to the success of the collection efforts of the creditor 13.

Figure 19:
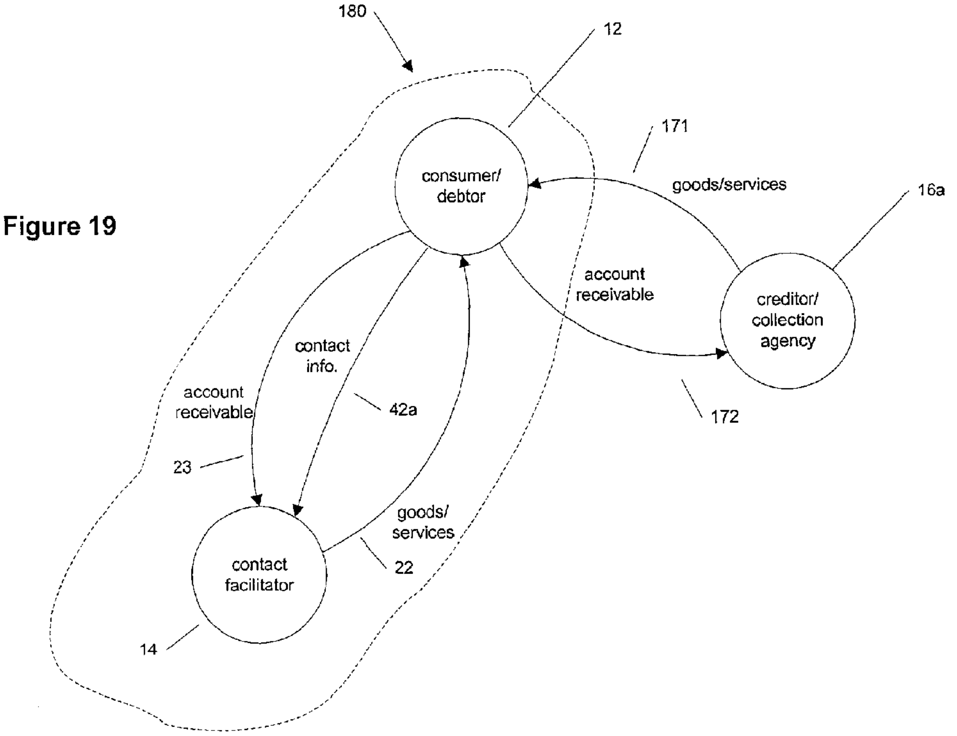
FIG. 19 is a block diagram of a typical subsequent transaction between a consumer and another merchant.

FIG. 19 is a block diagram of a typical subsequent interaction 180 between the consumer 12 and a contact facilitator 14, who may be a merchant or a teleservices bureau acting on behalf of a merchant, and may or may not ultimately become a creditor. Since the same consumer 12 is involved in both transaction 170 and interaction 180, the parties and exchanges comprising the transaction 170 are left in FIG. 18 for reference. In this interaction 180, the consumer 12 interacts with the contact facilitator 14, for example, by conducting a second transaction similar to transaction 170, wherein good/services represented by arrow 22, are exchanged for an account receivable, represented by arrow 23. Contact facilitator 14 could be either a standalone merchant or a teleservices bureau that handles outsourced customer service or support functions on behalf of the merchant. Accordingly, for clarity and conciseness, FIG. 18 illustrates contact facilitator 14 as shown in FIGS. 1-4, once again for convenience only and not to limit the scope of the invention.

In the course of conducting the interaction 180, the contact facilitator 14 will generally receive contact information 42*a* from the consumer 12. Most likely, this contact information 42*a* will be current and accurate, given the circumstances surrounding the interaction 180. For example, if consumer 12 is calling contact facilitator 14 to order goods for shipment to the consumer 12, the consumer 12 has incentive to provide correct, current contact information 42*a*, if for no other reason than to ensure prompt receipt of the ordered goods. However, if the creditor 16*a* is attempting to collect an overdue debt from consumer 12 using outdated contact information, then under the circumstances shown in FIG. 18, the current contact information 42*a* has no way to reach creditor 16*a* at all, much less on the real-time basis needed to ensure effective collection. This is the problem addressed by the invention.

Figure 20:
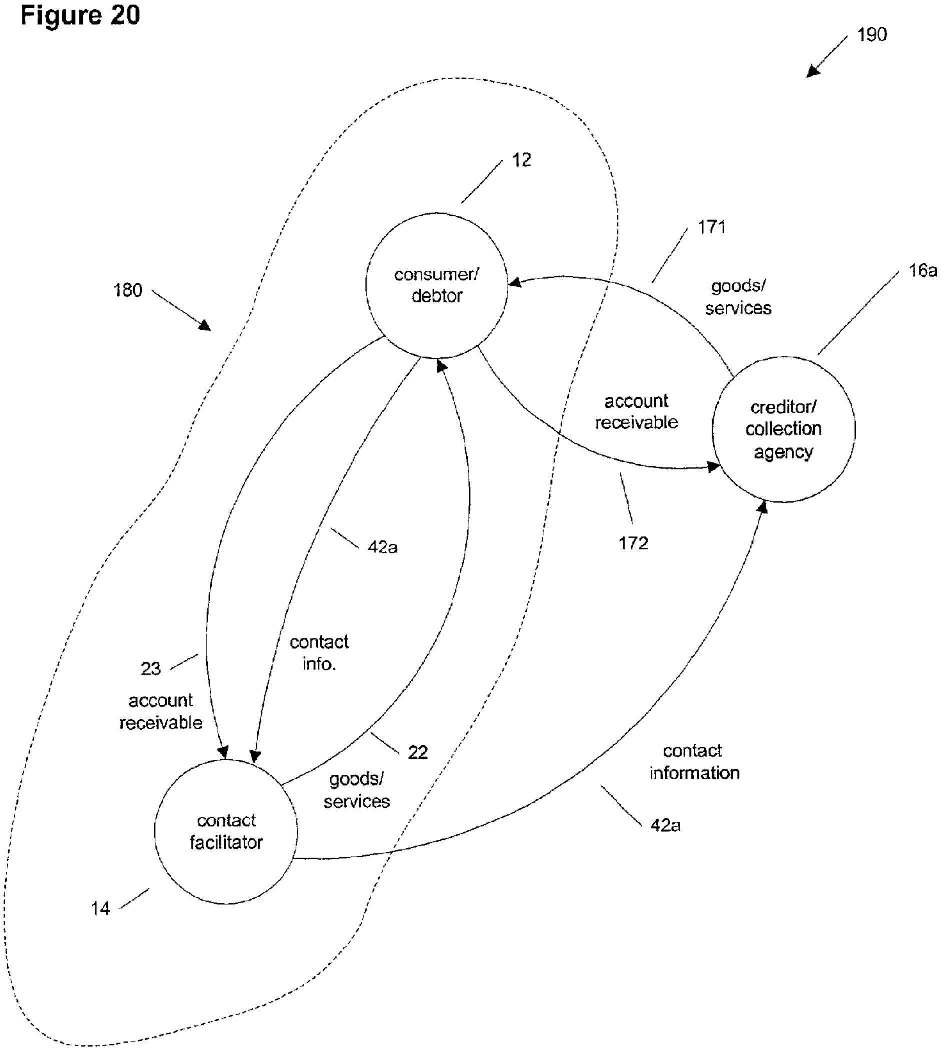
FIG. 20 is a block diagram of the subsequent transaction as shown in FIG. 19, but further illustrating a communication link and flow of contact information from the consumer ultimately to the creditor.

FIG. 20 is a block diagram of an interaction 190 as shown in FIG. 18, but further illustrates a flow of contact information 42*a* from the consumer 12 ultimately to the creditor 16*a*, as represented by arrows 42*a* and 46. As described in further detail below, the flow of contact information 42*a* as represented by the arrow between consumer 12 and contact facilitator 14 occurs in real time relative to the flow of contact information 42*a* as represented by the arrow between contact facilitator 14 and creditor 16*a*. This real time data flow enables the creditor 16*a* to receive this current contact information almost contemporaneously with the completion of the transaction 180, as represented by the arrows 23 and 22. For example, if the consumer 12 phoned the contact/facilitator 14 to place an order for goods or services, the creditor 16*a* could receive the consumer's current contact information 42*a* from the contact facilitator 14 by the time that phone call terminates. Accordingly, the creditor 16*a* could place a collection call to the consumer 12 almost immediately after the consumer 12 hangs up with contact facilitator 14, thereby greatly increasing the probability that the creditor 13 will reach the consumer 12. "Real time" in the context of this application refers to a time period sufficient to enable the creditor/collection agency 16*a* to contact the consumer 12 sufficiently quickly after the consumer 12 has terminated the interaction 180 with contact facilitator 14 (see FIGS. 18 and 19) that the consumer 12 has little or no opportunity to evade the contact from creditor 16*a*.]

Survey Respondent Embodiment

Figure 3:
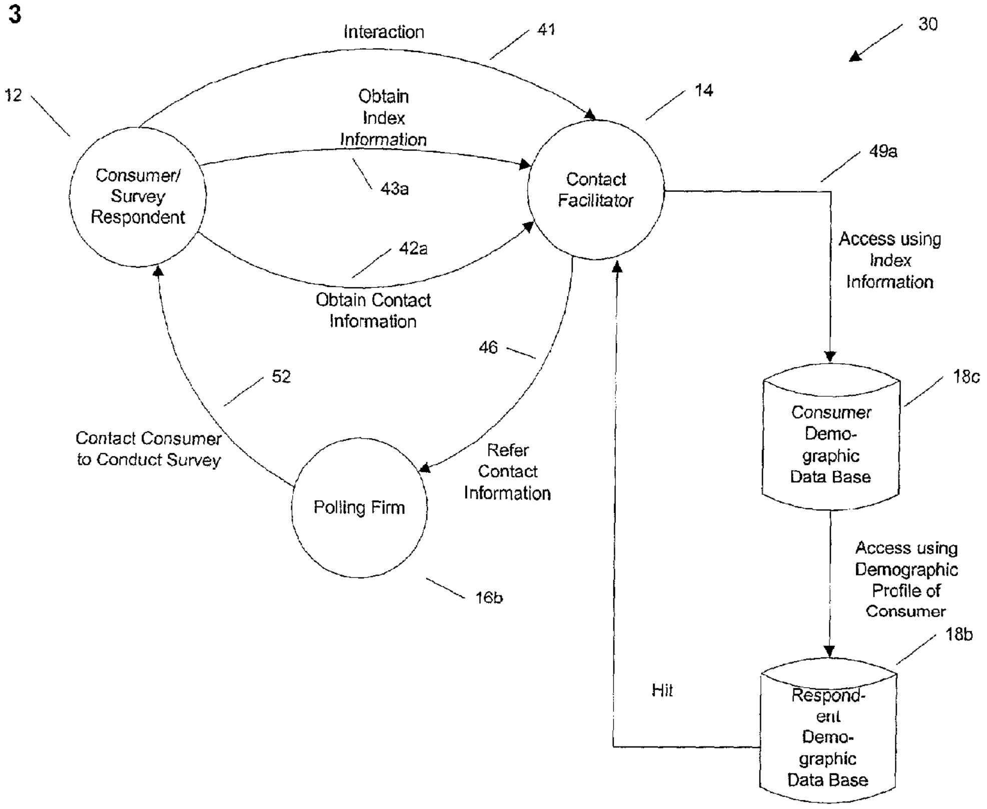
FIG. 3 is a block diagram of the invention as applied in the context of locating survey respondents.

FIG. 3 is a block diagram of an embodiment 30 of the invention as applied in the context of locating survey respondents for a polling firm 16*b*. In this embodiment 30, the data store 18 takes the form of a consumer demographic database 18*c* and a respondent demographic database 18*b*, and the requesting entity 16 takes the form of polling firm 16*b*. The selection criterion for this embodiment is whether the consumer 12 falls within a demographic group sought by polling firm 16*b*. For example, the polling firm 16*b* may seek to conduct a marketing survey of consumer respondents having demographic characteristics that fall within prescribed ranges. The desired demographic data sought in the survey respondents may be stored in the respondent demographic database 18*b*, which is typically provided by the polling firm 16*b*, but may also be generated by the contact facilitator 14 based on specifications from the polling firm 16*b*. The consumer demographics database 18*c* stores demographic information associated with consumers 12 who may contact the contact facilitator 14. For example, if the contact facilitator 14 is a teleservices bureau, the contact facilitator 14 can build the consumer demographics database 18*c* over time based on previous interactions with various consumers 12. In this case, the contact facilitator 14 accesses a ready-made database of consumer demographic profiles. Alternatively, if a given consumer's demographic profile is not in the database 18*c*, the contact facilitator 14 might obtain at least part of that profile on-the-fly while interacting with the consumer 12, and store that profile in the database 18*c* for future reference.

In this embodiment 30, the step of accessing a data store 18 includes accessing a consumer demographics database 18*c* storing a plurality of respective demographic profiles, with one each of the demographic profiles associated with a respective consumer 12. The consumer demographics database 18*c* is searchable using the index information 43*a* obtained from the consumer 12, and the respondent demographics database 18*b* is searchable using at least part of the demographic profile retrieved from the consumer demographics database 18*c*. The step of evaluating includes retrieving a consumer's demographic profile using the index information 43, comparing the demographic profile with the demographic criteria specified in the respondent demographics database 18*b*, and selecting a consumer 12 as a survey respondent if the demographic profile of that consumer matches the demographic criteria sought by the polling firm 16*b*. The step of referring includes referring the contact information 42 for at least one consumer 12 who matches the demographic criterion of interest to the polling firm 16*b*.

For an operational example, assume that a consumer 12 phones a toll free number to place an order for a consumer item. If the number is owned by a teleservices bureau, the consumer's call will be routed to a telemarketing representative within that bureau, who will in turn take the consumer's order. In the process of taking the order, the representative will typically obtain payment information, such as a credit card number. This credit card number or other information can be used as the index information 43*a* into the consumer demographics database 18*c*, which containing demographic data associated with the consumer, such as age, sex, income, occupation, or the like. This demographic data can in turn be used as an index into the respondent demographics database 18*b*, which contains the demographic characteristics sought by the polling firm 16*b*. For example, the polling firm 16*b* may wish to conduct several different surveys, with each survey being targeted to a specific demographic group. In this case, the respondent demographics database 18*b* might contain a respective entry for each different survey, with each entry containing sub-fields that specify the demographic requirements for that particular survey.

By comparing the consumer's demographic data to these subfields, the method of the invention can determine whether the consumer 12 is a candidate respondent for any of the surveys defined in the respondent demographics database 18*b*, preferably in real-time while the consumer 12 is still on the phone with the representative. If the consumer 12 is found to be a demographic match, the method of the invention can include offering the consumer 12 an incentive to participate in the survey, such as free shipping on the item ordered, product upgrades, additional products, or the like. Typically, the polling firm 16*b* would bear the cost of these incentives in exchange for receiving a pool of well-qualified survey leads. If the consumer 12 agrees to participate in the survey, the consumer's contact information 42 is referred to the polling firm 16*b*, who in turn contacts the consumer 12 later to conduct the survey.

Customer Service Embodiment

FIG. 4 is a block diagram of an embodiment 40 of the invention as applied in the context of locating a consumer 12 for customer service. In this embodiment 40, the data store 18 takes the form of a customer support database 18*d*, and the requesting entity 16 takes the form of a merchant 16*c*. The customer support database 18*d* stores a list of customers that the merchant 16*c* is attempting to contact. Typically, the customer service database 18*d* is provided by the merchant 16*c*, but the database 18*d* could also be generated by another party such as the contact facilitator 14, who has received the customer list from the merchant 16*c*. The step of accessing a data store includes accessing a customer service database 18*d* containing information associated with at least one consumer 12 sought by a merchant 16*c*. The step of evaluating includes comparing the index information 43 with the information in the customer service database 18*d* to determine whether the merchant 16*c* seeks the consumer 12 for a customer service matter. The step of referring includes referring the contact information 42 for at least one consumer 12 who is sought for customer service by the merchant 16*c*.

Method of Use

Figure 7:
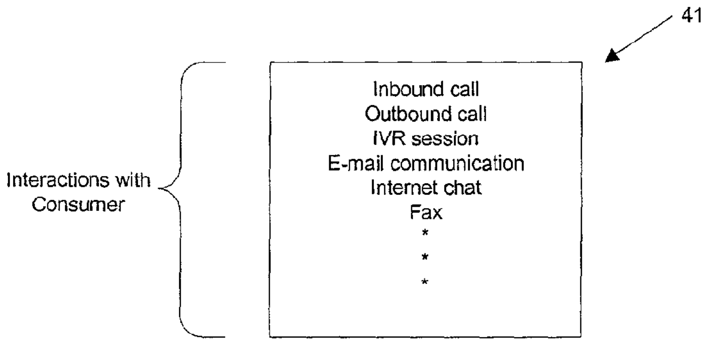
FIG. 7 is a diagram illustrating the various methods by which the interacting step shown in FIG. 5 might occur.

FIG. 7 is a diagram illustrating the various methods by which the interaction shown in block 41 of FIG. 5 might occur. For example, the step 41 of interacting with the consumer 12 can include interacting with the consumer 12 during either an inbound or an outbound telephone call conducted with the consumer 12. Inbound calls might include calls initiated by the consumer 12 to purchase goods/services or to seek customer service care or support. Outbound calls might include calls initiated by a contact facilitator 14. Other methods of contact might include a consumer session interacting with an Interactive Voice Response (IVR) unit, e-mail communications with the consumer 12, Internet chat sessions, communications via facsimile, or other communication methods.

Figure 8:
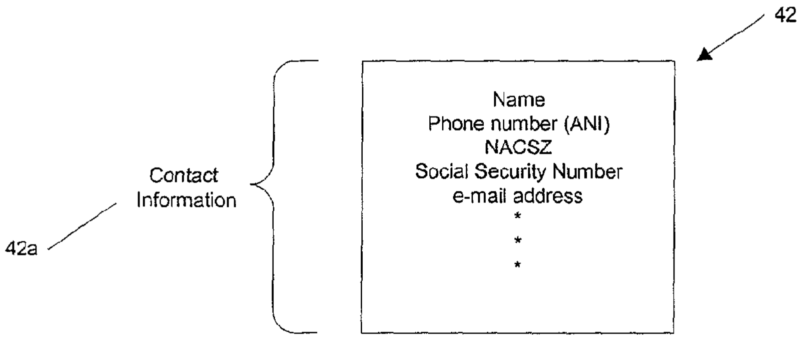
FIG. 8 is a diagram illustrating the various types of contact information that may be obtained according to various aspects of the method of the invention.

FIG. 8 is a diagram illustrating the various types of contact information obtained in block 42 of FIG. 5. Generally, "contact information" 42*a* in the context of this description refers to any information that enables a requesting entity 16 (which may take the form of collection agency 16*a* in FIG. 2, polling firm 16*b* in FIG. 3, or merchant 16*c* in FIG. 4) to contact the consumer 12 in real time after the consumer 12 interacts with the contact facilitator 14. Examples of suitable contact information 42*a* might include, without limitation, the consumer's name, daytime or evening telephone number, facsimile number, e-mail address, social security number, or the consumer's Name, street Address, City, State, and Zip code information, commonly known in the art as NACSZ information. Regarding the telephone number example, the telephone number of the station from which an inbound call originates can be provided by the Automatic Number Identification (ANI) function, as well known in the art. Given the ANI information, it is possible to obtain the location of the originating station using known databases such as those provided by TARGUS, Inc. (www.targusinfo.com).

Figure 9:
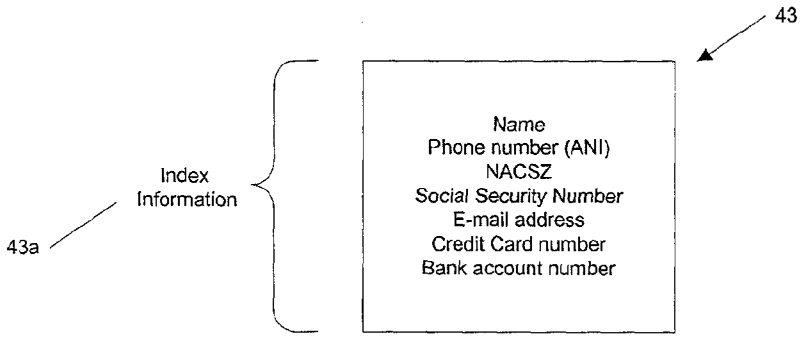
FIG. 9 is a diagram illustrating the various types of index information that may be obtained according to various aspects of the method of the invention.

FIG. 9 is a diagram illustrating the various types of index information 43*a* obtained in block 43 of FIG. 4. Generally, "index information" 43*a* in the context of this description refers to any information that supports or enables a determination that a consumer 12 might meet a selection criterion defined by the requesting entity 16. The method of the invention searches databases such as collection database 18*a*, consumer demographics database 18*c*, respondent demographic database 18*b*, or customer support database 18*d* to make this determination. Considering the debt collection example, databases or other forms of data stores are maintained by creditors 16*a* or collection agencies and contain records pertaining to each consumer 12 who is subject to a collection effort. As known in the art of database management, a database must be indexed in some manner to be searchable and to facilitate retrieval of a record or records associated with a given index field. Accordingly, the index information 43*a* obtained by the method of the invention will vary depending on what index fields are supported by the data store 18 with which the method operates. Common examples of suitable index information 43*a* might include consumer names, telephone numbers, facsimile numbers, e-mail addresses, social security numbers, NACSZ parameters, or the like. As shown by this example, the index information 43*a* and the contact information 42*a* can overlap to some degree, but this need not be the case, depending on the circumstances surrounding a given application of the invention.

Figure 10:
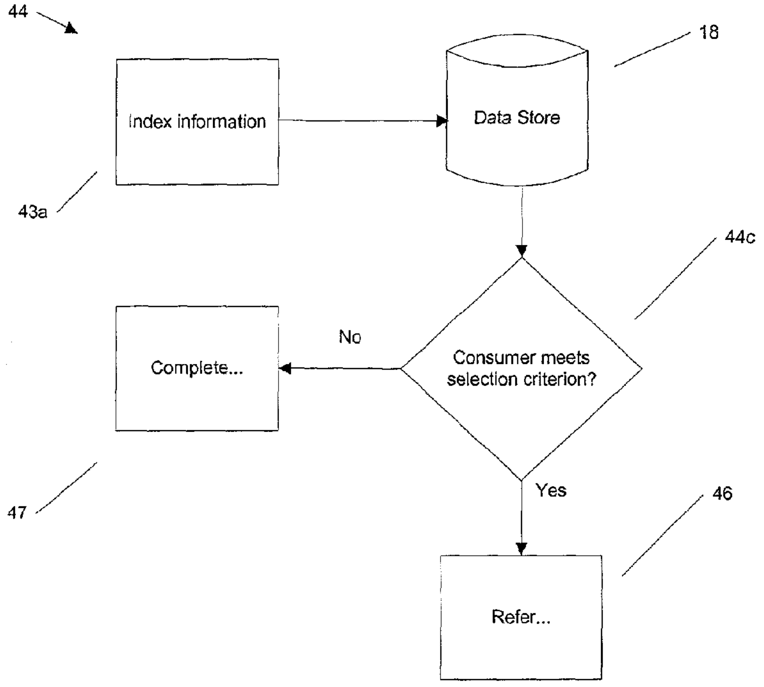
FIG. 10 is a diagram of processing performed by the method during the determining step shown in FIG. 5.

FIG. 10 is a diagram of processing performed by the method during the determining step 44 shown in FIG. 5. The determining step 44 includes searching the data store 18 using the index information 43*a* as an index into the data store 18. If index information 43*a* points to a record in the data store 18 that corresponds to the consumer 12, as evaluated at step 44*c*, then the consumer 12 meets a selection criterion, and processing proceeds to the referring step 46 shown in FIG. 1. Otherwise, the consumer's pending interaction with the contact facilitator 14 is completed as shown at step 47.

Figure 11:
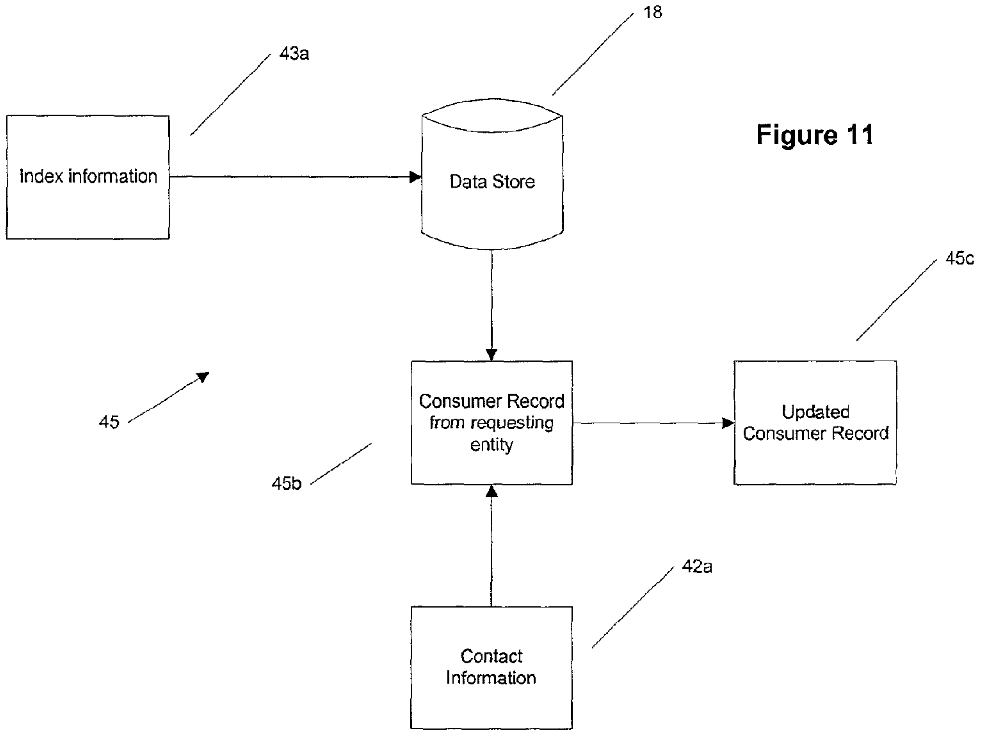
FIG. 11 is a diagram of processing performed by the method during the updating step shown in FIG. 5.

FIG. 11 is a diagram of processing performed by the method during the updating step 45 shown in FIG. 1. Index information 43*a* is used to retrieve a corresponding consumer record 45*b* from data store 18. Contact information 42*a* resulting from the consumer's interaction with the contact facilitator 14 is merged with consumer record 45*b*, resulting in an updated consumer record 45*c*, which is stored in the data store 18 and then passed on to referring step 46.

Figure 15:
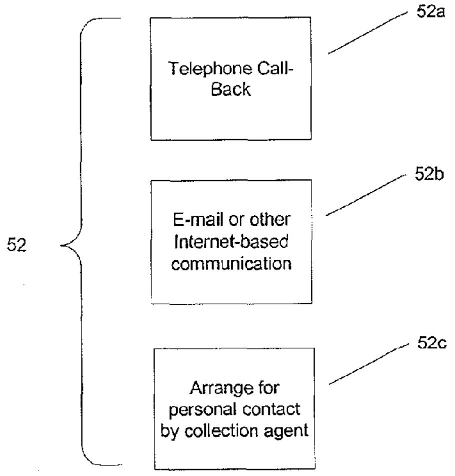
FIG. 15 is a block diagram of the contacting step shown in FIG. 5, illustrating several methods by which the consumer may be contacted.

FIG. 15 is a block diagram of the contacting step 52 shown in FIG. 5, illustrating several methods by which the consumer 12 may be contacted, at least one of which may be chosen in a given application of the invention. For example, a creditor, merchant, or collection agency (collectively referred to as collection agency 16*a*) owed money by the consumer 12 might initiate a telephone call-back to the consumer 12 using the contact information 42*a* just acquired from the consumer 12, as shown in block 52*a*. Similarly, those same entities might initiate a contact to the consumer 12 via a wide area network, such as the Internet or World Wide Web, using known web browsers and/or e-mail transmission software, as shown in block 52*b*. Finally, those entities may use the method of the invention to facilitate or arrange for an in-person contact with the consumer 12, using the contact information 42*a* just obtained, as shown in block 52*c*.

Figure 16:
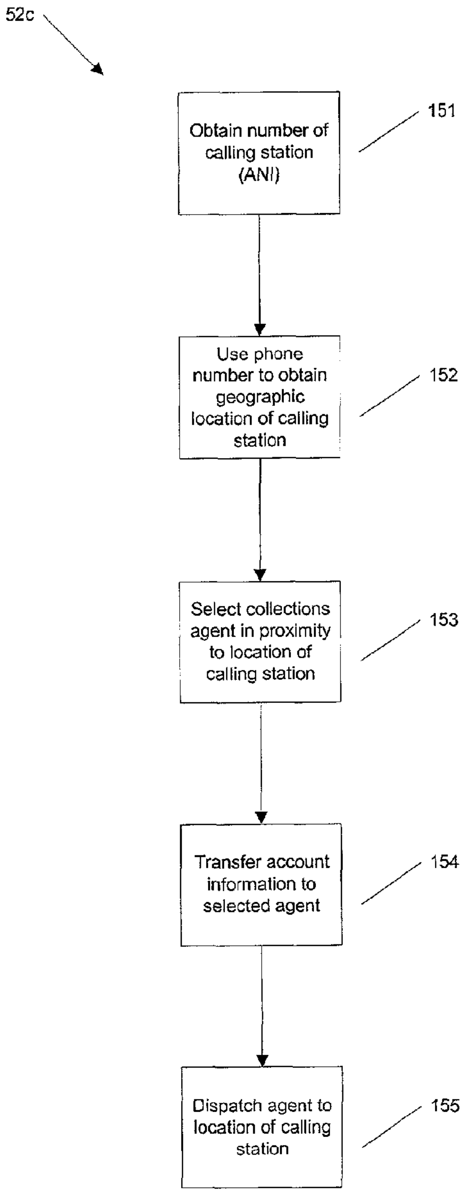
FIG. 16 is a flowchart of one of the blocks shown in FIG. 14, illustrating how arrangements may be made to facilitate personal contact by a collection agent.

FIG. 16 is a flowchart of block 52*c* shown in FIG. 15, illustrating how the method of the invention can operate to facilitate personal contact between a collection agent representing collection agency 16*a* and the consumer 12. This step of facilitating 52*c* can include obtaining a physical or geographic location from which a consumer phone call was initiated, as shown in block 151. As discussed above, using known ANI functionality, the method of the invention can obtain a phone number of a calling station from which a consumer phone call was initiated. Given this calling station number, the method can use this number as an index into a database to obtain the physical or geographic location from which the call originated, as shown in block 152. For example, the TARGUS databases discussed above may be suitable for this function.

Given the location from which the consumer's call originated, a collection agent is selected to contact the consumer, as shown in block 153. Generally, it is most feasible to select the agent that is located nearest the consumer's location. The method can locate the collection agent nearest the consumer by comparing the locations of all collection agents to the location of the calling station. For example, a collection agency might track the respective locations of all their agents using a global positioning system (GPS), and these agent locations could be compared to the location of the calling station using known triangulation algorithms or other suitable distance measurement algorithms. A database or other data store may contain areas of responsibility assigned to each one of a plurality of collection agents, and the method can select a collection agent responsible for the area containing the location of the calling station.

However, it should be understood that the agent need not be selected strictly based on geographic location. For example, if a given collection case requires the collections agent to have particular skills, an agent having those skills might be selected regardless of his/her proximity to the consumer. Likewise, if a given agent is assigned an account corresponding to a given consumer, this assigned agent might be chosen regardless of proximity to the physical location of the consumer. These agent skills or consumer account responsibilities can be stored in a data store or database that can be referenced as necessary to select a collection agent based on these criteria.

Once an agent is selected, the contact information 42*a* for the consumer 12 is transferred to the selected collection agent, along with any account information or other data that may be appropriate in a given application, as shown in block 154. This transfer function might be carried out using known communication devices such as telephones, pagers, mobile phones, or any other device adapted to communicate using either wired or wireless technology, for example, land lines or radio-frequency communication channels. Once this information is transferred to the agent, the collection agency can dispatch the collection agent to the consumer's location to attempt contact, as shown in block 155.

It is to be understood that these methods are listed for example only, and are not intended to limit the scope of the invention. Other contact methods may become apparent to those skilled in the art.

Figure 17:
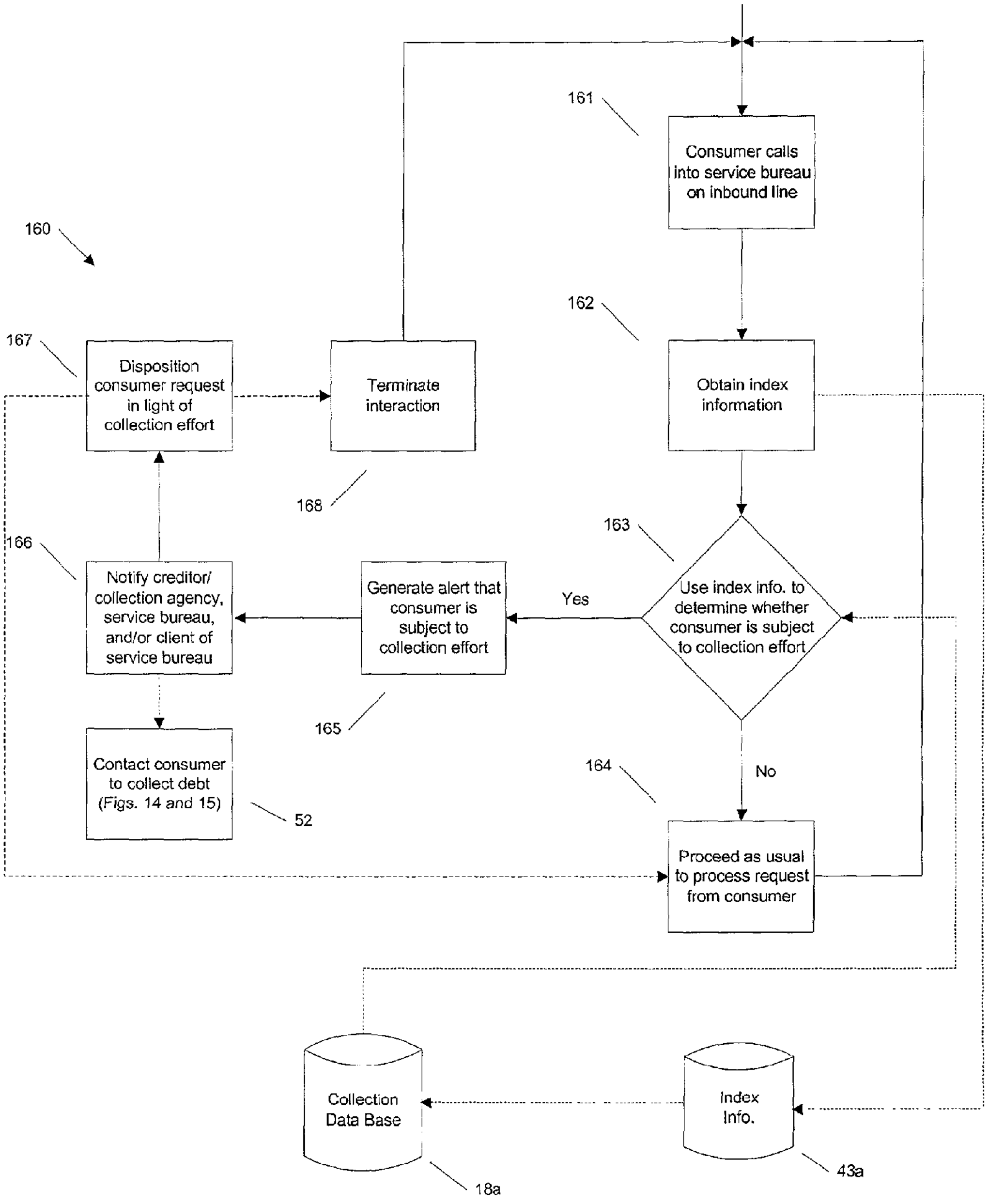
FIG. 17 is a flowchart showing processing performed according to an illustrative embodiment of the invention.

FIG. 17 is a flowchart showing processing performed according to an illustrative embodiment 160 of the invention. The invention provides a method of screening at least one consumer calling a teleservices bureau with the method comprising the following steps.

In block 161, the teleservices bureau interacts with the consumer over a communication link coupling the consumer and the teleservices bureau. This interaction can include inbound calls originating with the consumer, outbound calls originating with the bureau, or interaction over a wide area network, such as the Internet or World Wide Web. These calls could involve sales of products and/or services, customer support or the like. As shown in block 162, the method obtains index information 43*a*, such as a telephone number of the station from which the consumer 12 is calling, from the consumer 12 during this interaction. This index information 43*a* is used to evaluate whether the consumer 12 is subject to a collection effort, shown in block 163, such as by accessing a collection database 18*a*, as discussed above. If the consumer 12 is subject to a collection effort, the method generates an appropriate alert (block 165), and notifies at least a first party that the consumer is subject to a collection effort (block 166). Several parties are shown within block 166 for example only.

According to different aspects of the invention, the step of notifying in block 166 can include notifying a client of the teleservices bureau about the status of the consumer 12, or notifying a collection agency 16*a* seeking to collect a debt from the consumer 12. In block 167, the method dispositions the interaction with the consumer 12 depending on the instructions of the service bureau client. This dispositioning step may include proceeding with the consumer 12 on a "business as usual" basis (dashed-line to block 164) or terminating the interaction immediately (dashed-line to block 168). The dashed lines connecting block 167 to blocks 164 and 168 indicate alternative processing paths chosen depending on the client's wishes. Certain bureau clients may wish to avoid transacting with consumers who have known credit or financial problems and are thus willing to forego the potential interaction with the consumer (block 168). On the other hand, other bureau clients may not have such concerns and are willing to proceed despite the risk of future collection issues with the consumer (block 164). In either event, processing control eventually returns to the point indicated above block 161, where the method waits to process the next consumer interaction. According to one aspect of the invention, the party notified in block 166 can attempt to contact the consumer 12 to collect the debt, as represented by block 52.

Returning briefly to block 163, if the result of block 163 indicates that the consumer is not subject to a pending collection effort, then the interaction is handled on a "business per usual" basis, as shown in block 164. Control then returns to block 161 to await the next consumer interaction.

Figure 12:
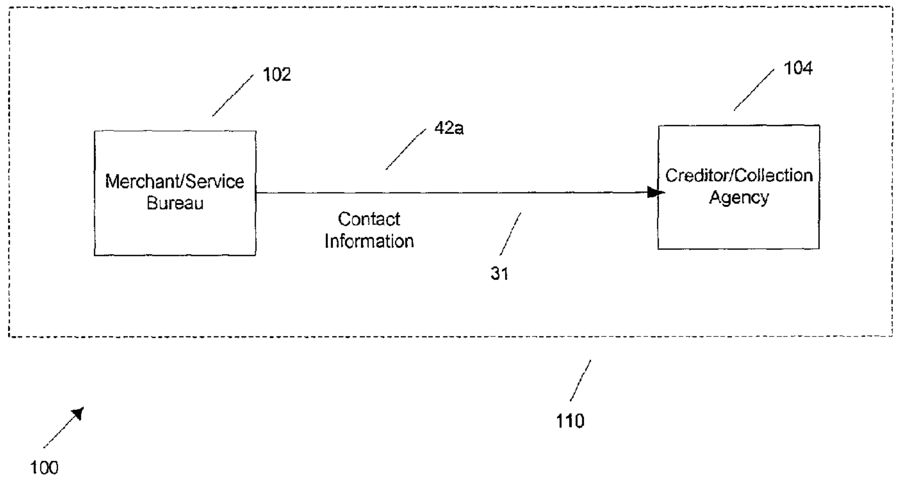
FIG. 12 illustrates an embodiment of the invention wherein at least the steps of interacting, obtaining, referring and contacting steps are performed by one single integrated business entity.

FIG. 12 illustrates an embodiment 100 of the invention wherein at least the interacting step 41, obtaining steps 42 and 43, referring step 46 and contacting step 52 are performed by one single integrated business entity 110 comprising respective sub-entities 102 and 104 that perform functions corresponding to a merchant/service bureau 21 and the creditor/collection agency 16*a*. In this embodiment 100, the sub-entity 102 corresponding to the merchant/service bureau 21 could perform the interacting step 41, obtaining steps 42 and 43, evaluating step 44, updating step 45, and the referring step 46. The sub-entity 104 corresponding to the creditor/collection agency 16*a* could perform the contacting step 52. These sub-entities 102 and 104 could be respective affiliates within one parent corporate entity, different business units within one corporation, groups of employees, working in separate groups, or the like.

For example, the entity 110 could be a teleservices or other type of services bureau that performs various direct response customer service, customer care or other customer relationship management functions outsourced from clients. Entity 110 could receive and process inbound phone calls from customers on behalf of one client within sub-entity 102, while generating outbound collection calls on behalf of another client within sub-entity 104. Assuming that the entity 110 has made the appropriate business and contractual arrangements between the two clients served by sub-entities 102 and 104, the entity 110 transfers the contact information represented by the arrow 42*a* between the in-house sub-entities 102 and 104 performing the inbound and outbound customer support functions. This information could be transferred via a high-speed data communication link, also represented by arrow 31. The exact technology underlying this link could readily be chosen by one skilled in the art, given the teaching of this description and the requirements applicable to a given application. It should be understood that the two sub-entities 102 and 104 referred to above need not be in the same physical location; instead, they could be geographically separated but coupled to communicate via the high-speed link 31.

Figure 13:
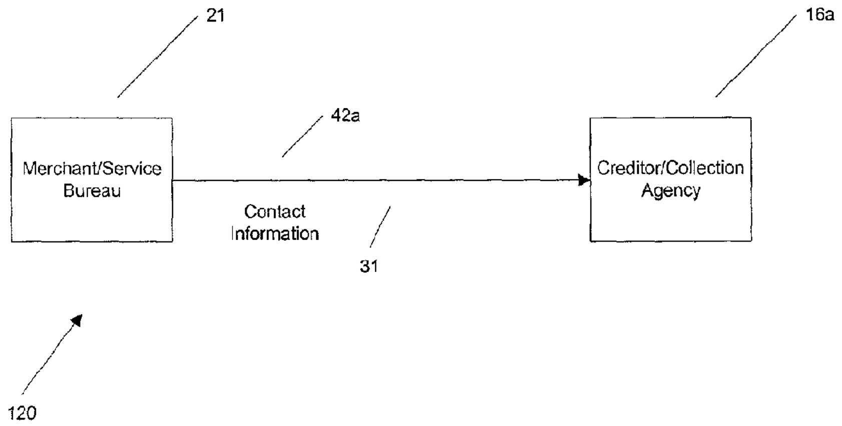
FIG. 13 illustrates an embodiment of the invention wherein the merchant/service bureau and a collection agency are separate business entities, coupled by a real-time communication link.

FIG. 13 illustrates an embodiment 120 of the invention wherein the merchant/service bureau 21 and the collection agency 16*a* are separate business entities, preferably coupled by a real-time high-speed communication link 31. The functional responsibilities allocated respectively to the merchant/service bureau 21 and the creditor/collection agency 16*a* remain the same as in FIG. 12. However, rather than being integrated into one single business entity 102 as shown in FIG. 12, the merchant/service bureau 21 and the creditor/collection agency 16*a* are housed in separate business entities, such as corporation A and corporation B. Because two separate business entities are involved in the FIG. 13 embodiment, appropriate contractual arrangements to transfer the consumer along link 31 may be necessary. It will be understood that the specific business forms chosen by entities 102 and 104 are not critical to the practice of the invention.

One key advantage of the invention is its ability to communicate current contact information to the creditor/collection agency 16*a* in real-time along link 31, thereby providing the creditor 16*a* with a "hot" lead to reach the consumer 12. The features of the invention contributing to this real-time performance characteristic are the integration of the steps shown in FIG. 5 into the merchant/service bureau 21, and the high-speed communication link 31 coupling the bureau 21 with the creditor/collection agency 16*a*. As discussed above, the merchant/service bureau 21 and the collection agency 16*a* can be combined in one business entity (FIG. 12) or split across separate business entities (FIG. 13).

Figure 14:
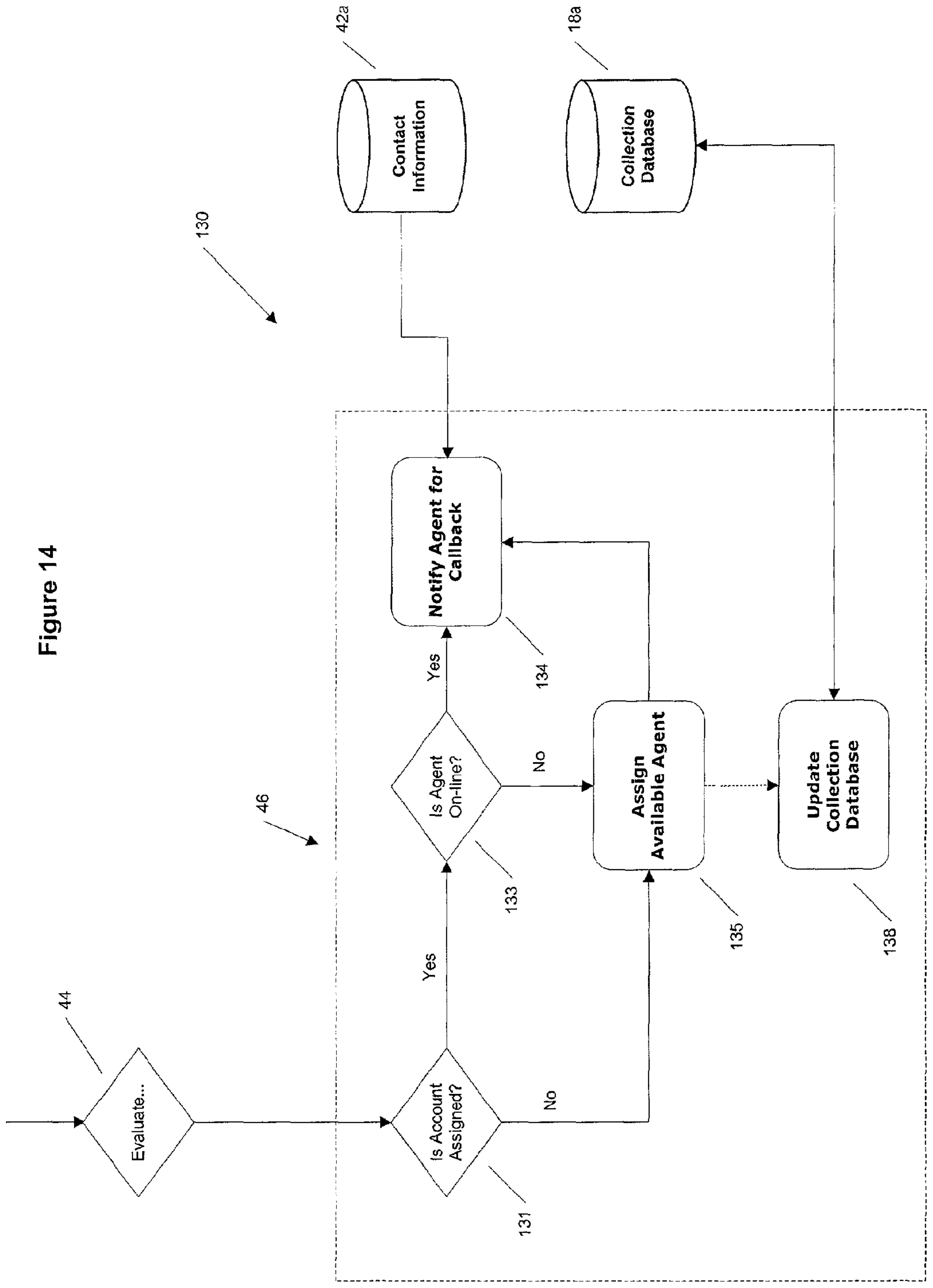
FIG. 14 is a combined block diagram and flowchart illustrating the operating environment of the invention, and the processing flow provided by various embodiments of the invention.

FIG. 14 is a combined block diagram and flowchart illustrating the operating environment of the invention, and the processing flow provided by an embodiment 130 of the invention, applied to debt collection. The referring step 46, as shown in FIGS. 5 and 6, includes evaluating whether a collection account corresponding to the consumer 12 is assigned to a predetermined collections representative, shown in block 131. If so, the method evaluates whether the predetermined collection representative is on-line, shown in block 133. If so, the contact information 42*a* is provided to that predetermined collection representative and that representative is notified to contact the consumer 12, shown at block 134.

If the predetermined collection representative is not on-line (block 133), then an available collections representative is selected and assigned to contact the consumer 12, and the contact information 42*a* is provided to this representative, as shown at block 135. This representative is then notified to contact the consumer 12, as shown at block 134.

Returning to block 131, if a collection account corresponding to the consumer 12 is not assigned to a predetermined collections representative, then the method selects and assigns an available collections representative to contact the consumer 12 and provides the contact information 42*a* to the representative, shown in block 135. The representative is then notified to contact the consumer 12, as shown in block 134.

At block 138, the collections database 18*a* is updated as necessary to indicate the representative now assigned to the collections record associated with a given consumer 12, and to update any consumer contact information with contact information 42*a*. The dashed arrow connecting blocks 135 and 138 indicates that step 138 need not be done contemporaneously or in real-time relative to the other processing illustrating in FIG. 13. The update step 138 could be performed in a subsequent batch database update run as understood by those skilled in the art.

Business Method

The invention provides a business method for facilitating contact between a consumer and a requesting entity. In an illustrative embodiment, the business method can include the following steps. Two entities enter into an agreement creating a business arrangement in which a first entity, for example, a contact facilitator 14, which can be a teleservices bureau operating either in-house at a merchant or operating separately from a merchant, refers current contact information 42*a* for at least one consumer 12 to a second entity, for example, a collections agency 16*a*. In exchange for this contact information 42*a*, the collection agency 16*a* sends at least a first payment to the contact facilitator 14. Under this business arrangement, the contact facilitator 14 conducts at least the following steps (shown in FIG. 5): interacting with the consumer 12 (block 41), obtaining contact information 42*a* from the consumer 12 (block 42), obtaining index information 43*a* from the consumer 12 (block 43), determining that the consumer 12 meets a selection criterion using the index information 43*a* (block 43), and referring the contact information 42*a* to the requesting entity 16.

The payment terms defined by the first agreement can include at least one of the following, or various combinations of the following. First, the contact facilitator 14 and the requesting entity 16 might agree on a flat-fee arrangement, under which the requesting entity 16 pays some predefined amount per unit of time under the contract, regardless of the number of interactions with consumers 12 or the number of referrals generated by the contact facilitator 14. Second, the payment from the requesting entity 16 to the contact facilitator 14 could be based on the number of consumer interactions conducted by the contact facilitator 14. Finally, the payment from the requesting entity 16 to the contact facilitator 14 could be based on the number of consumer contacts referred by the contact facilitator 14. Those skilled in the art will recognize that the invention as described herein may be extended to other payment arrangements. The other method steps discussed above under the Method of Use section can also be practiced according to various illustrative embodiments of the business method described herein.

As illustrated and discussed above in connection with FIG. 13, the agreement may be made between a teleservices bureau 21 and a collection agency 16*a*. The teleservices bureau 21 may be either an in-house operation hosted by a merchant entity, or a third-party teleservices bureau to which a merchant has outsourced customer relationship management functions. In the former case, the step of interacting with the consumer 12 includes interacting with consumers 12 who are customers of the merchant entity hosting the in-house teleservices bureau. In this case, the merchant entity might decide that the payments from the collection agency 16*a* resulting from referring the merchant's customers to the collection agency 16*a* outweigh any potential alienation of those customers. This issue would typically be addressed between the teleservices bureau 21 and the collection agency 16*a* while negotiating the agreement between those parties.

In the latter case above, the third-party teleservices facility 21 and a third entity, such as a merchant served by the teleservices facility 21, enter into an agreement, under the terms of which the teleservices facility 21 provides outsourced customer relationship management services to the merchant in exchange for payment(s) from the merchant. In this embodiment, the step of interacting with the consumer 12 includes interacting with consumers 12 who are customers of the merchant. If these customers of the merchant are subject to a collection effort, then contact information 42*a* for those customers is referred to the collection agency 16*a*, thereby exposing the merchant to the risk of losing customers. To balance this risk to the merchant's business, the teleservices bureau 21 may agree to transfer a payment to the merchant based on a number of customers referred by the teleservices bureau 21 to the collection agency 16*a*.

Computer-Readable Storage Device or Medium

The invention provides a program storage device 200 (see FIGS. 4 and 5) that is readable by a machine, tangibly embodying a program of instructions executable by the machine to perform method steps for facilitating collection of debt owed by a consumer. Generally, at least the method steps illustrated in FIG. 4, taken either severally or in combination, can be implemented on a general-purpose computer system programmed to implement the steps described in this application. Such a system can be located at a teleservices bureau as discussed above. As shown in FIG. 4, illustrative method steps can include interacting with the consumer (block 41), obtaining contact information from the consumer (block 42), obtaining index information from the consumer (block 43), evaluating whether the consumer is the subject of a collection effort using the indexing information (block 44), and referring the contact information to an entity involved with the collection effort (block 46). The other method steps discussed in connection with FIGS. 9, 10, 13, 15 and 16 can also be implemented by suitable computer code developed in accordance with the teaching of this application by those skilled in the art. The method of the invention can be implemented using any number of programming languages, scripting or markup languages, or other environments, including, but not limited to, C, C++, Visual Basic, HTML, Java, or the like. Further, some or all of the other method steps discussed above may be implemented by program code residing on storage device 200, according to various embodiments of the invention.

The program storage device 200 can include any magnetic, optical, or semiconductor based technology suitable for storing computer data, whether such technology involves either volatile or non-volatile storage media. Such media can include, but are not limited to, magnetic hard or floppy disks drives, optical media or CD-ROMs, and semiconductor-based memory technology, whether implemented in read-only or random access memory.

The previous description has set forth a set of illustrative embodiments intended to facilitate understanding of the invention by those skilled in the art. However, this description is not intended to limit the invention, as those skilled in the art will recognize that this description can be varied, modified, and/or extended to other applications within the scope and spirit of the invention. Accordingly, the scope of the invention should be determined from the claims appended hereto.

We claim:

1. A method, comprising:

processing, by a facilitator, calls on behalf of a requesting entity;

interacting with a consumer to obtain information from the consumer and forward the obtained information to the requesting entity, wherein the interacting is initiated by the consumer and/or the facilitator via any wired or wireless communication system linking the consumer to the facilitator including at least one of: an inbound call to the facilitator, an outbound call to the consumer, an email communication with the facilitator, an internet chat with the contact facilitator, a facsimile transaction to the facilitator, an interaction via broadband, an interaction via voice over internet protocol to the facilitator, a interaction via digital/analog television to the facilitator;

wherein the obtained information includes at least one of:

contact information;

index information;

accessing, via the facilitator, a data store using the index information, the data store containing at least one selection criterion of interest to the requesting entity, wherein the selection criterion uses the index information obtained from the consumer and wherein the index information is a credit card number;

wherein accessing the data store includes the facilitator accessing a consumer demographics database storing a demographic profile associated with the consumer;

searching, by an automated programmed electronic computer, a respondent demographics database accessed using the demographic profile, that includes an entry containing sub-fields that specify demographic requirements for an action to be taken;

evaluating, by the automated programmed electronic computer, whether the consumer meets the selection criterion by comparing the consumer's demographic profile to the demographic requirements and determining if the consumer is a candidate for the action to be taken while the consumer is interacting with the requesting entity; and referring the contact information received from the facilitator to the requesting entity based on the evaluating, wherein if the consumer is subject to a collection effort, generating an appropriate alert, and notifying at least a first party that the consumer is subject to the collection effort.

2. The method of claim 1, wherein the step of accessing a data store includes accessing a collections database to evaluate whether the consumer is subject to a collections effort conducted by a collections agency.

3. The method of claim 2, wherein the step of evaluating includes determining whether any entry in the collections database corresponds to the consumer.

4. The method of claim 2, wherein the step of referring the contact information includes referring the contact information to a collections agency.

5. The method of claim 1, wherein the step of accessing a data store includes accessing a respondent demographic database containing at least one demographic criterion of interest to a polling firm.

6. The method of claim 5, wherein the step of evaluating includes determining whether the consumer meets the demographic criterion of interest to the polling firm.

7. The method of claim 5, wherein the step of accessing a data store includes accessing a consumer demographic database storing a plurality of respective demographic profiles, one of the demographic profiles being associated with a respective consumer, wherein the consumer demographic database is searchable using the index information, and wherein the respondent demographic database is searchable using the demographic profiles; and wherein the step of evaluating includes retrieving a demographic profile associated with the consumer using the index information, comparing the demographic profile with the demographic criterion contained in the respondent demographic database, and selecting a consumer whose demographic profile matches the demographic criterion.

8. The method of claim 5, wherein the step of referring includes referring to the polling firm the contact information for at least one consumer who matches the demographic criterion of interest to the survey agency.

9. The method of claim 1, wherein the step of accessing a data store includes accessing a customer service database containing information associated with at least one consumer sought by a merchant.

10. The method of claim 9, wherein the step of evaluating includes comparing the index information with the information in the customer service database to determine whether the consumer is sought by the merchant for customer service.

11. The method of claim 10, wherein the step of referring includes referring the contact information for at least one consumer to the merchant.

12. The method of claim 1, wherein the step of interacting with the consumer includes interacting with the consumer during a telephone call conducted with the consumer.

13. The method of claim 1, wherein the step of interacting with the consumer includes communicating with the consumer using at least one of the following methods: an inbound telephone call originating with the consumer, an outbound call placed to the consumer, a consumer session with an IVR unit, an e-mail message, and an Internet chat session.

14. The method of claim 1, wherein the step of obtaining contact information includes obtaining information that enables the requesting entity to contact the consumer in real time after the step of interacting.

15. The method of claim 1, wherein the step of obtaining contact information includes obtaining at least one of the following associated with the consumer: a telephone number, a facsimile number, an e-mail address, an account number, a social security number, and a NACSZ parameter.

16. The method of claim 1, wherein the step of obtaining index information includes obtaining information that enables an entity to determine whether the consumer meets the selection criterion.

17. The method of claim 1, wherein the step of obtaining index information includes obtaining at least one of the following associated with the consumer: a telephone number, a facsimile number, an e-mail address, an account number, a social security number, and a NACSZ parameter.

18. The method of claim 1, wherein the step of evaluating includes searching the data store using the index information as an index into the data store, and locating a record corresponding to the consumer.

19. The method of claim 1, wherein at least the steps of interacting, obtaining, and referring are performed by one entity.

20. The method of claim 1, wherein at least the steps of interacting, obtaining contact information, obtaining index information, evaluating and referring are performed by one entity in real time.

21. The method of claim 1, wherein the step of referring includes referring the contact information to an entity separate from an entity that performed the step of interacting.

22. The method of claim 1, wherein the step of referring includes referring the contact information to the same entity that performed the step of interacting.

23. The method of claim 1, further comprising the step of updating a data store entry associated with the consumer with the contact information.

24. The method of claim 1, further comprising the step of contacting the consumer using the contact information.

25. The method of claim 24, wherein the step of contacting is performed after the step of referring.

26. The method of claim 24, wherein at least the steps of interacting, obtaining, referring, and contacting are performed by one entity in real time.

27. The method of claim 24, wherein at least the steps of interacting, obtaining, and referring are performed by a first entity, and the step of contacting is performed by a second entity that is coupled by a real-time communication link to the first entity.

28. The method of claim 1, wherein the step of referring includes determining that a collection account corresponding to the consumer is assigned to a predetermined collections representative, determining that the predetermined collections representative is on-line, providing the contact information to the predetermined collections representative, and notifying the predetermined collections representative to contact the consumer.

29. The method of claim 1, wherein the step of referring includes determining that a collection account corresponding to the consumer is assigned to a predetermined collections representative, determining that the predetermined collections representative is not on-line, assigning an available collections representative to contact the consumer providing the contact information to the available collections representative, and notifying the available collections representative to contact the consumer.

30. The method of claim 1, wherein the step of referring includes determining that a collection account corresponding to the consumer is not assigned to a predetermined collections representative, assigning an available collections representative to contact the consumer, providing the contact information to the available collections representative, and notifying the available collections representative to contact the consumer.

31. The method of claim 24, wherein the step of contacting includes performing at least one of the following steps:

initiating a telephone call to the consumer;

initiating a contact with the consumer over a wide area network; and facilitating an in-person contact with the consumer.

32. The method of claim 31, wherein the step of facilitating comprises at least the following steps:

obtaining a location from which a consumer telephone call was initiated;

selecting a collection agent located proximate to the location;

transferring the contact information to a collection agent; and dispatching the collection agent to the location.

33. The method of claim 32, wherein the step of obtaining the location includes obtaining a phone number of a calling station from which a consumer phone call was initiated, and using the phone number as an index into a database to obtain the location.

34. The method of claim 32, wherein the step of transferring is performed by at least one of a pager, a mobile phone, and a device coupled to communicate by a radio-frequency communication link.

35. The method of claim 32, wherein the step of selecting a collection agent includes performing at least one of the following steps:

comparing a location of a collection agent as shown by a global positioning system to the location of the calling station; and referencing a database containing areas of responsibility assigned to each one of a plurality of collection agents and selecting a collection agent responsible for an area containing the location of the calling station.

36. A method, comprising:

processing, by a facilitator, calls on behalf of a requesting entity;

interacting with a consumer to obtain information from the consumer and forward the obtained information to the requesting entity, wherein the interacting is initiated by the consumer and/or the facilitator via any wired or wireless communication system linking the consumer to the facilitator including at least one of: an inbound call to the facilitator, an outbound call to the consumer, an email communication with the facilitator, an internet chat with the contact facilitator, a facsimile transaction to the facilitator, an interaction via broadband, an interaction via voice over internet protocol to the facilitator, a interaction via digital/analog television to the facilitator;

wherein the obtained information includes at least one of:
contact information;
index information;

evaluating, by an automated programmed electronic computer, whether the consumer is the subject of a collection effort using the indexing information, generating an appropriate alert, and notifying at least a first party that the consumer is subject to the collection effort, wherein the facilitator performs the evaluating based on the index information;

referring, by the automated programmed electronic computer, the current contact information from the facilitator to one of a plurality of collection agents involved with the collection effort based on the evaluating; and contacting the consumer by the one of the plurality of collection agents based on the referring.

37. A method, comprising:

receiving a contact by a consumer, wherein contact information for the consumer is outdated;

obtaining index information from the consumer;

providing a facilitator that interacts with the consumer to obtain information from the consumer and forward the obtained information to a requesting entity, wherein the interacting is initiated by the consumer and/or the facilitator via any wired or wireless communication networking system linking the consumer to the facilitator including at least one of: an inbound call to the facilitator, an outbound call to the consumer, an email communication with the facilitator, an internet chat with the contact facilitator, a facsimile transaction to the facilitator, an interaction via broadband, an interaction via voice over internet protocol to the facilitator, a interaction via digital/analog television to the facilitator;

obtaining selection criterion, by an automated programmed electronic computer, using the index information obtained from the consumer and wherein the index information is a credit card number;

evaluating, by an automated programmed electronic computer, whether the consumer is subject to a collection effort using the index information;

obtaining current contact information from the consumer via the facilitator;

notifying a first party, by the automated programmed electronic computer, that the consumer is subject to a collection effort; and providing the first party with the current contact information based on a location of the first party to a location of a calling station of the consumer and based on an area of responsibility assigned to the first party.

38. The method of claim 37, wherein the step of notifying includes notifying a client of the teleservices bureau.

39. The method of claim 37, wherein the step of notifying includes notifying a collection agency seeking to collect a debt from the consumer.

40. The method of claim 37, wherein the step of interacting includes at least one of:

receiving an inbound telephone call originating with the consumer; and interacting with the consumer over a wide area network.

41. A non-transitory computer-readable storage medium comprising instructions for:

processing, by a facilitator, calls on behalf of a requesting entity;

interacting with a consumer to obtain information from the consumer and forward the obtained information to the requesting entity, wherein the interacting is initiated by the consumer and/or the facilitator via any wired or wireless communication system linking the consumer to the facilitator including at least one of: an inbound call to the facilitator, an outbound call to the consumer, an email communication with the facilitator, an internet chat with the contact facilitator, a facsimile transaction to the facilitator, an interaction via broadband with the facilitator, an interaction via voice over internet protocol with the facilitator, a interaction via digital/analog television with the facilitator;

wherein the obtained information includes at least one of:
contact information;
index information;

accessing a data store using the indexing information, the data store containing at least one selection criterion of interest to the requesting entity, wherein the selection criterion uses the index information obtained from the consumer and wherein the index information is a credit card number;

wherein accessing the data store includes the facilitator accessing a consumer demographics database storing a demographic profile associated with the consumer;

searching a respondent demographics database accessed using the demographic profile, that includes an entry containing sub-fields that specify demographic requirements for an action to be taken;

evaluating whether the consumer meets the selection criterion by comparing the consumer's demographic profile to the demographic requirements and determining if the consumer is a candidate for the action to be taken while the consumer is interacting with the requesting entity; and referring the contact information to the requesting entity based on the evaluating, wherein if the consumer is subject to a collection effort, generating an appropriate alert, and notifying at least a first party that the consumer is subject to the collection effort.

* * * * *